(12) United States Patent
Kona et al.

(10) Patent No.: US 10,951,600 B2
(45) Date of Patent: Mar. 16, 2021

(54) DOMAIN AUTHENTICATION

(71) Applicant: Microsoft Technology Licensing, LLC, Redmond, WA (US)

(72) Inventors: Kalyan K. Kona, Sammamish, WA (US); Patrick J. Simek, Redmond, WA (US); Le Chang, Bellevue, WA (US); Roshane Silva, Seattle, WA (US); Prashant Gaurav, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 222 days.

(21) Appl. No.: 15/589,569

(22) Filed: May 8, 2017

(65) Prior Publication Data
US 2018/0324161 A1 Nov. 8, 2018

(51) Int. Cl.
*H04L 29/06* (2006.01)
*H04W 12/00* (2021.01)

(52) U.S. Cl.
CPC .............. *H04L 63/08* (2013.01); *H04L 63/10* (2013.01); *H04W 12/009* (2019.01)

(58) Field of Classification Search
CPC ....... H04L 63/08; H04L 63/10; H04L 63/101; H04L 29/08072; H04L 29/06; H04L 29/12; H04L 29/08; G06F 21/6218; G06F 21/31; G06F 21/10; G06F 21/30; G06F 21/44; H04W 12/009
USPC ..... 726/4, 21, 17, 30, 27; 709/217, 229, 227
See application file for complete search history.

(56) References Cited

U.S. PATENT DOCUMENTS

| | | | |
|---|---|---|---|
| 7,228,417 B2* | 6/2007 | Roskind | G06F 21/31 |
| | | | 380/255 |
| 7,908,649 B1* | 3/2011 | Arora | H04L 67/2814 |
| | | | 726/7 |
| 9,197,644 B1* | 11/2015 | Sherman | H04L 63/0815 |
| 9,781,149 B1* | 10/2017 | Himler | H04L 63/123 |
| 9,912,687 B1* | 3/2018 | Wescoe | H04L 67/42 |
| 2002/0059425 A1 | 5/2002 | Belfiore et al. | |
| 2003/0046396 A1* | 3/2003 | Richter | G06F 9/505 |
| | | | 709/226 |

(Continued)

OTHER PUBLICATIONS

Aimonetti, Matt, "Building and implementing a Single Sign-On solution", http://merbist.com/2012/04/04/building-and-implementing-a-single-sign-on-solution/, Published on: Apr. 4, 2012, 12 pages.

(Continued)

*Primary Examiner* — Eric W Shepperd
*Assistant Examiner* — Khalid M Almaghayreh
(74) *Attorney, Agent, or Firm* — International IP Law Group, PLLC

(57) ABSTRACT

Various systems and methods for domain authentication are described herein. In an example, the method may include detecting a domain from a request of a tenant for access to a farm. The method may also include identifying a presence of a site ID from a database of the farm based on the domain. The method may also include sending an authentication request to a default site or a custom site, the authentication request managed through a site manager based on the identified presence of the site ID in the database of the farm. The method may also include routing traffic from the tenant to the farm in response to satisfaction of the authentication request.

18 Claims, 4 Drawing Sheets

(56) References Cited

U.S. PATENT DOCUMENTS

| | | | | |
|---|---|---|---|---|
| 2003/0065940 A1* | 4/2003 | Brezak | H04L 63/0815 | 726/4 |
| 2003/0149781 A1* | 8/2003 | Yared | H04L 63/0815 | 709/229 |
| 2005/0204041 A1* | 9/2005 | Blinn | H04L 63/08 | 709/225 |
| 2007/0130471 A1* | 6/2007 | Walker Pina | H04L 63/0853 | 713/182 |
| 2007/0245013 A1* | 10/2007 | Saraswathy | H04L 43/0811 | 709/223 |
| 2008/0162509 A1* | 7/2008 | Becker | G06F 16/2379 | |
| 2009/0049511 A1* | 2/2009 | Manickam | G06F 21/6254 | 726/1 |
| 2009/0235330 A1* | 9/2009 | Byun | G06Q 30/06 | 726/4 |
| 2010/0083355 A1* | 4/2010 | Brown | H04L 63/0815 | 726/5 |
| 2010/0125895 A1* | 5/2010 | Shull | H04L 63/08 | 726/4 |
| 2010/0161997 A1* | 6/2010 | Lee | H04L 9/32 | 713/189 |
| 2011/0154443 A1* | 6/2011 | Thakur | G06F 21/41 | 726/3 |
| 2011/0277026 A1* | 11/2011 | Agarwal | G06F 21/41 | 726/8 |
| 2012/0096266 A1* | 4/2012 | Fukuda | H04L 9/321 | 713/168 |
| 2012/0167193 A1* | 6/2012 | Gargaro | H04L 63/0846 | 726/8 |
| 2013/0160013 A1* | 6/2013 | Pires | G06F 21/41 | 718/1 |
| 2014/0208394 A1* | 7/2014 | Goodwin | H04L 63/102 | 726/4 |
| 2014/0280939 A1* | 9/2014 | Banatwala | H04L 63/20 | 709/225 |
| 2014/0282940 A1* | 9/2014 | Williams | H04L 63/10 | 726/6 |
| 2014/0304502 A1* | 10/2014 | Su | H04W 4/02 | 713/154 |
| 2014/0337500 A1* | 11/2014 | Lee | H04L 41/12 | 709/223 |
| 2015/0350601 A1* | 12/2015 | Sinha | H04L 63/08 | 348/14.01 |
| 2016/0019098 A1* | 1/2016 | Cahill | G06F 9/5077 | 709/222 |
| 2016/0057100 A1 | 2/2016 | Blinn et al. | | |
| 2016/0315969 A1* | 10/2016 | Goldstein | G06F 21/6218 | |
| 2017/0006032 A1* | 1/2017 | Simpson | H04W 4/21 | |
| 2017/0034118 A1* | 2/2017 | Gupta | H04L 43/045 | |
| 2017/0063986 A1* | 3/2017 | Gopal | H04L 67/1095 | |
| 2018/0041346 A1* | 2/2018 | Rathinasabapathy | H04L 9/3265 | |

OTHER PUBLICATIONS

"Case Study: Applications Fail to Launch from One Domain in Multi-Domain XenApp 6 Farm", https://support.citrix.com/article/CTX129596, Published on: Mar. 8, 2012, 4 pages.

"Configuring Single sign-on", https://docs.kentico.com/k9/managing-users/user-registration-and-authentication/ configuring-single-sign-on, Retrieved on: Mar. 22, 2017, pp. 1-2.

"Is it possible to support multiple domain names on a single web application?", http://stackoverflow.com/questions/25651876/is-it-possible-to-support-multiple-domain-names-on-a-single-web-application, Retrieved on: Mar. 24, 2017, 1 page.

"Multiple security domains", https://www.ibm.com/support/knowledgecenter/en/SSAW57_8.5.5/com.ibm.websphere.nd.doc/ae/csec_sec_multiple_domains.html, Retrieved on: Mar. 24, 2017, 13 pages.

Porter, Bryan L., "Multiple Authentication Methods in SharePoint 2010", https://blogs.msdn.microsoft.com/brporter/2010/05/10/multiple-authentication-methods-in-sharepoint-2010/, Published on: May 10, 2010, 7 pages.

* cited by examiner

DOMAIN AUTHENTICATION

BACKGROUND

Multiple resources can be pooled together and can be referred to collectively as a farm. A tenant can use a farm individually or groups of users can share use of a farm. As used herein, a tenant is representative of an organization or client with access to a content management system stored or hosted on a farm. A tenant can be a group of users who share a common access with specific privileges to the content management system. In some examples, content management systems can be implemented on shared hardware such as farms, where the shared hardware is to be separately used by a number of tenants that can have different configurations.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment provides a system that distributes requests. In an example, a system for domain authentication includes a processor and storage to store instructions for execution on the processor. The system for domain authentication may also include instructions that, when executed on the processor, detect a domain from a request of a tenant for access to a farm. The system for domain authentication may also include instructions that, when executed on the processor, identify a presence of a site ID from a database of the farm based on the domain. The instructions, when executed by the processor, may send an authentication request to a default site or a custom site, the authentication request managed through a site manager based on the identified presence of the site ID in the database of the farm. The system may include instructions, that when executed on the processor, route traffic from the tenant to the farm in response to satisfaction of the authentication request.

An embodiment provides a method for domain authentication. In an example, the method may include detecting a domain from a request of a tenant for access to a farm. The method may also include identifying a presence of a site ID from a database of the farm based on the domain. The method may also include sending an authentication request to a default site or a custom site, the authentication request managed through a site manager based on the identified presence of the site ID in the database of the farm. The method may also include routing traffic from the tenant to the farm in response to satisfaction of the authentication request.

Another embodiment provides a tangible, computer-readable medium including instructions that, when executed by a processor, authenticate a domain. In an example, a processor executing instructions may detect a domain from a request of a tenant for access to a farm. In an example, a processor executing instructions may identify a presence of a site ID from a database of the farm based on the domain. In an example, a processor executing instructions may send an authentication request to a default site or a custom site, the authentication request managed through a site manager based on the identified presence of the site ID in the database of the farm. In an example, a processor executing instructions may route traffic from the tenant to the farm in response to satisfaction of the authentication request.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
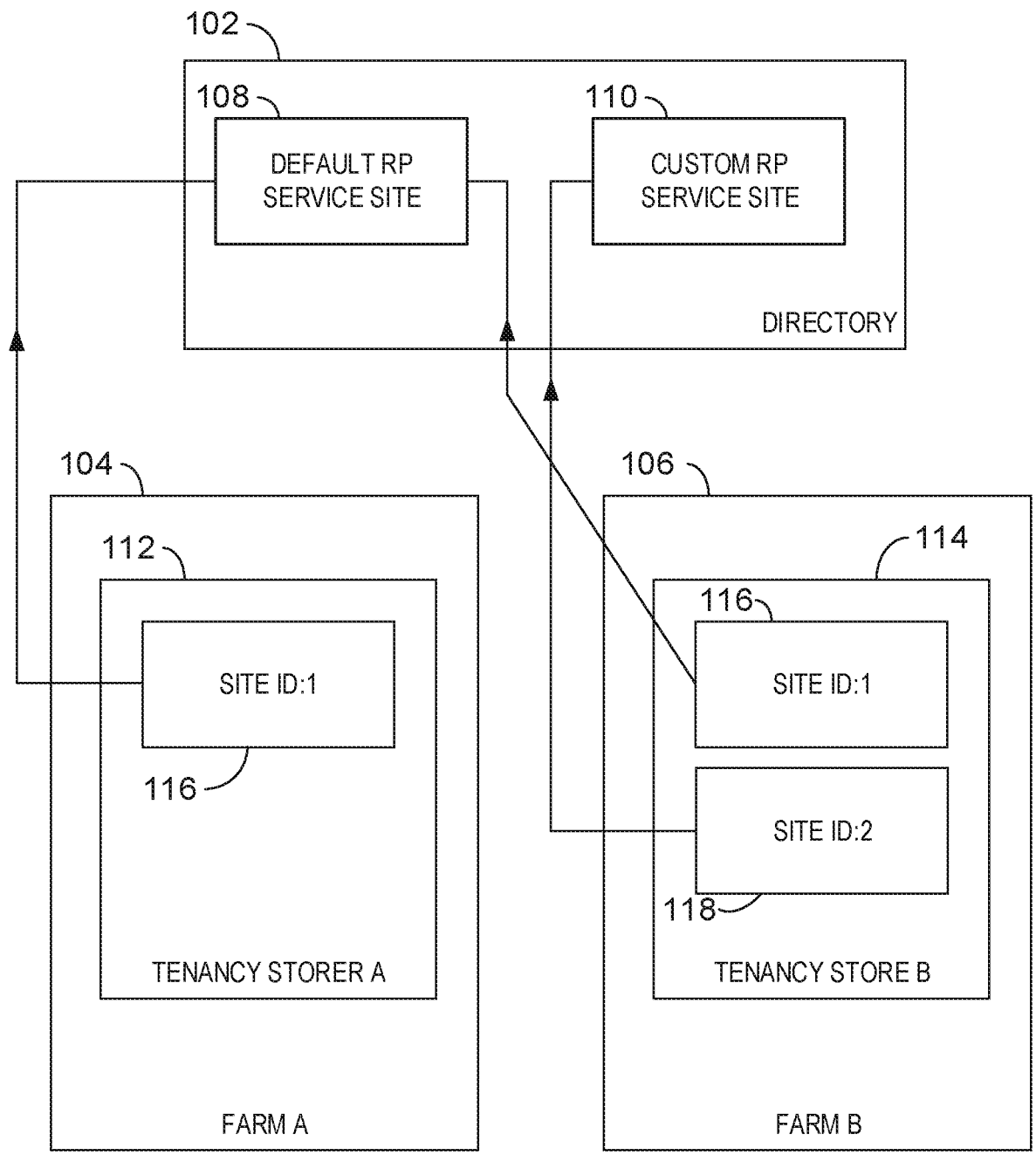
FIG. 1 is a schematic of an example of farm-level content management system.

In this disclosure, a content management system can be implemented on a farm to allow the farm to authenticate a tenant through a number of authentication configurations corresponding to both default domains and dedicated domains. As discussed herein, a farm is a collection of servers or structured query language (SQL) servers that work in concert to provide a set of services that support a single site. A dedicated domain refers to a domain name that is individual for a tenant such as a vanity uniform resource locator (URL) for use in external web hosting, internal file systems, and email applications. For an authenticating tenant an example of a vanity URL could include, AuthenticatingTenantVanityUrl.com. The disclosed content management system may deploy an authentication method to handle the shared or partially shared domain, for example SharedDomain.Tenant.com.

The disclosed content management system allows farms supporting the disclosed features to handle tenants logging-in from different domain types at a single instance of the content management system. These tenants logging-in from different domains share network resources. As used herein, tenant refers to customers, farm resource users, and users that are accessing the content management system for authentication purposes.

Through the use of the disclosed techniques, a tenant could manage their files with a content management system while still using their own URLs for accessing hardware of the content management system. From the perspective of the content management system the synchronization of authentication through the use of the disclosed database allows the content management system to handle both default domains and custom, dedicated domains in a single instance rather than through multiple instances. The presently disclosed technique allows a content management system to avoid deploying a separate instance of a management application for each domain used while still allowing both dedicated custom domains as well as default shared domains. The technique disclosed allows the sharing of farm resources by multiple tenant each with varying domains.

The figures may describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

The term "logic" encompasses any functionality for performing a task. For instance, the operations illustrated in the flowcharts corresponds to logic for performing that operation. An operation can be performed using software, hardware, firmware, physical electronic circuits, and the like, or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter.

Computer-readable storage devices or media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). Computer-readable storage media does not include all implementations of computer-readable media generally, such as signals per se. Therefore, in contrast, computer-readable media generally (i.e., not computer-readable storage media) may additionally include communication media such as transmission media for wireless signals and the like.

FIG. 1 is a schematic of an example of farm-level content management system 100. While the blocks shown in FIG. 1 are shown separately, several of the blocks may function in a single device or across several devices.

The farm-level content management system 100 can include a directory 102 for identity and access management. The directory 102 may be co-located with a farm such as farm A 104 or farm B 106. In an example, the directory 102 may be implemented by a remote server or locally located within a farm of the overall system. As used herein, a directory may store a number of authentication methods stored in locations referred to herein as service sites. In some embodiments, a system can include any suitable number of farms such as farm A 104 and farm B 106. Each farm can host any number of network accessible resources. For example, farm A 104 and farm B 106 can include storage devices, processors, and the like. The network accessible resources of each farm can be shared between multiple tenants. For example, the network accessible resources can be partitioned such that particular processors or storage devices are allocated to a particular tenant.

In some examples, each farm can detect a request to access data stored on a network accessible resource allocated to the tenant. In some examples, the network resources of a tenant may be accessible using different site identifiers. A site identifier, as referred to herein, indicates a network address or URL that corresponds to a network resource of a tenant. Each site identifier can enable a tenant to access a network accessible resource using a different authentication technique. In some embodiments, each farm can detect an authentication technique associated with a site identifier from a directory. The directory can store a default authentication technique and any suitable number of custom authentication techniques. In some examples, each farm includes a database that associates each site identifier with an authentication technique residing in the directory.

Within the directory 102, multiple divisions called relying party (RP) sites may be created including a default RP service site 108 and a custom RP 110 service site. As used herein, relying party refers to a server providing access to a secure software application, for example, a content management system on a farm. The default RP service site 108 may provide authentication services to tenants using a default domain. In an example, the default domain is a shared domain with other tenants using the farm-level content management system 100. The custom RP service site 110 may provide authentication services to tenants using a custom domain. In an example, the custom domain is a dedicated domain reserved for use by the tenant that secured the particular custom domain for use.

Each farm of the system 100 can include any suitable number of remote servers, storage devices, and the like that can host a service for a tenant. In some embodiments, each farm of the system 100 can include resources, such as storage devices, processors, and the like, which are reserved for a tenant. Farm A 104 includes tenancy store A 112 and farm B includes a separate tenancy store B 114 because a tenant may have resources located within one farm. Tenancy store A 112 and tenancy store B 114 may include databases, formatted as files stored in the farms, or another suitable means of provisioning, logging, and storing information about the tenants assigned to their respective farm as well as RP service site information. In an example tenancy store A 112 is a configuration file and can be formatted as an eXtensible Markup Language (XML) file.

In the present technique, if a farm is provisioning a tenant, the tenant may need to be authenticated to gain access to farm resources. One aspect of this authentication can include matching the tenant domain of the access request to an approved domain separately stored by the farm-system. In order to achieve software multitenancy, a farm uses the tenancy store to handle both dedicated and shared domains in the same instance of the content management system for that farm. The term software multitenancy refers to a software architecture in which a single instance of software runs on a server and serves multiple tenants.

Farm B 106 includes tenancy store B 114 to provide software multitenancy for a number of domain types. As discussed above, tenants may use custom domains that include a preferred name chosen by the tenant, such as a vanity URL. Tenants may use default domains that can be used by the farm-level content management system 100 unless otherwise specified. These different types of domains may authenticate for farm access using different configurations, methods, processes, and files. As discussed above, the directory 102 includes RP service sites to authenticate a tenant based, at least in part, on the type of domain of the tenant. To route the tenant authentication request properly, the tenancy store B 114 includes Site ID: 1 116 to correspond to the default RP service Site 108 and Site ID: 2 118 to correspond to the custom RP Service Site 110. As used herein, a Site ID may be used for two functions, to point to the location of a specific RP service site, and to be matched to a domain associated with an access request made by the tenant. When a tenant makes a request to access the farm, the authentication of the tenant can include identifying the domain associated with the tenant request for access. The presence of that domain can be searched for within the tenancy store 114. If a custom domain is found in the tenancy store B 114, the tenancy store B 114 may provide Site ID: 2 118 which can be used to link the request to the custom RP service site 110 in the directory 102. The site ID: 2 118 may identify a connection path or a location of the custom IP service site within the directory 102.

If no dedicated domain, such as a custom domain, is being used by the tenant then a default authentication process can be used for a default shared domain. In tenancy store B 114, the default RP service site 108 can be identified by Site ID: 1 116. The routing to a default RP service site 108 through a default site ID, such as Site ID: 1 116 can take place in a tenancy store like tenancy store A 112 where no other domain types have been provisioned or assigned site ID numbers. In an example, the RP service site and a corresponding site ID are created in response to the initial provisioning of a custom domain for a tenant. During an initial provisioning of a custom domain, an RP service site corresponding to an authentication method can be placed in the directory 102. During the initial provisioning of the custom domain the RP service site can have a corresponding site ID to route a request from a tenant to access a farm to a RP service site, where the site ID is stored in the tenancy store of the target farm to be accessed.

Figure 2:
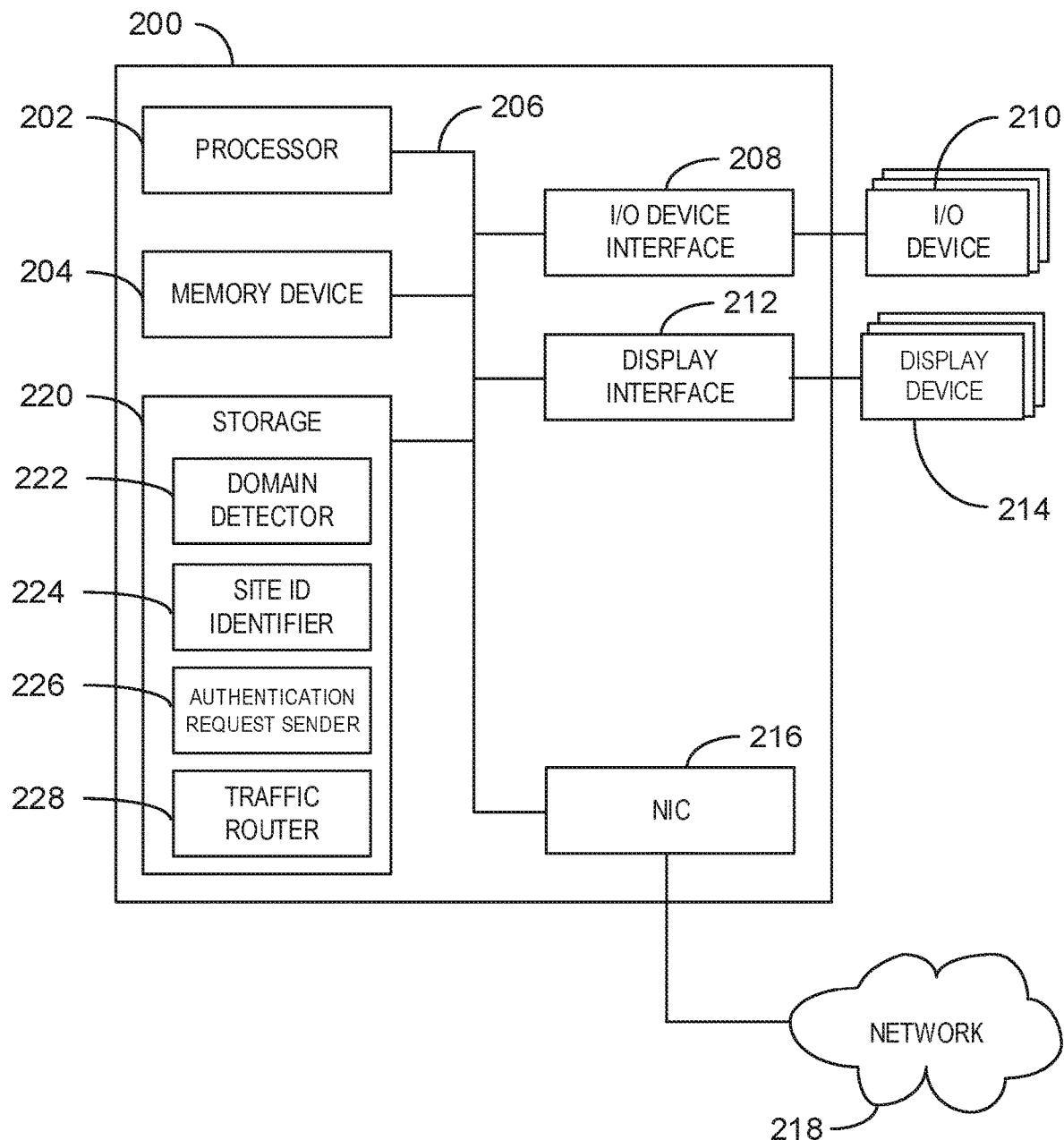
FIG. 2 is a block diagram of an example of a computing system for domain authentication.

FIG. 2 is a block diagram of an example of a computing system 200 for domain authentication. The computing system 200 may be, for example, a mobile phone, laptop computer, desktop computer, or tablet computer, among others. The computing system 200 may include a processor 202 that is adapted to execute stored instructions, as well as a memory device 204 that stores instructions that are executable by the processor 202. The processor 202 can be a single core processor, a multi-core processor, a computing cluster, or any number of other configurations. The memory device 204 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems.

The processor 202 may be connected through a system bus 206 (e.g., PCI, ISA, PCI-Express, NuBus, etc.) to an input/output (I/O) device interface 208 adapted to connect the computing system 200 to one or more I/O devices 210. The I/O devices 210 may include, for example, a keyboard, a gesture recognition input device, a voice recognition device, and a pointing device, wherein the pointing device may include a touchpad or a touchscreen, among others. The I/O devices 210 may be built-in components of the computing system 200, or may be devices that are externally connected to the computing system 200.

The processor 202 may also be linked through the system bus 206 to a display device interface 212 adapted to connect the computing system 200 to a display device 214. The display device 214 may include a display screen that is a built-in component of the computing system 200. The display device 214 may also include a computer monitor, television, or projector, among others, that is externally connected to the computing system 200. A network interface card (NIC) 216 may also be adapted to connect the computing system 200 through the system bus 206 to a network 218.

The storage 220 can include a hard drive, an optical drive, a USB flash drive, an array of drives, cloud storage, network area storage, or any other suitable storing means or combinations thereof. The storage 220 may include a domain detector 222, a site ID identifier 224, an authentication request sender 226, and a traffic router 228.

The domain detector 222 can detect a domain from a request of a tenant for access to a farm. In an example, the domain indicates a domain association as one of a dedicated domain or a shared domain.

The site ID identifier 224 can identify a presence of a site ID from a database of the farm based on the domain. In an example, the database of the farm is maintained on hardware of the farm. In an example, the site ID can be stored in a flat file such as an XML file. In cases where the site ID is stored in a flat file, the flat file may be copied and stored on each of a number of machines in the farm. The site ID may be in a database or a flat file based on if it points towards a network location on the content management system or to an RP site. These IDs can be used to ensure the correct authentication party that the request gets routed to.

The authentication request sender 226 can send an authentication request to a default site or a custom site, the authentication request managed through a site manager based on the identified presence of the site ID in the database of the farm. In an example, the custom site provides a custom authentication method in response to a detection of a site ID in the database, and the default site provides a default authentication method in response an absence of site ID detection in the database. In an example, the custom authentication method comprising binding the site ID to the authentication method. In an example, the authentication method is an authentication protocol. In an example, the authentication method is an authentication configuration. As used herein, the authentication protocol includes a series of security steps to be executed before authentication is granted. As used herein, an authentication configuration includes a setting or environment of a device that allows it to communicate with an authenticating RP service site. In an example, the site manager is a directory maintained on hardware of the farm.

The traffic router 228 can route traffic from the tenant to the farm in response to satisfaction of the authentication request. In an example, satisfaction of the authentication request is achieved through matching a listing of the domain at the custom site or the default site to the domain from the request of the tenant. In an example, a site ID can be created in response to initial provisioning a resource from a farm to a tenant using a dedicated domain.

In an example, a domain can be checked against the RP service site configuration, with the request routed for authentication based on the domain detected. A tenancy store, such as tenancy store B 106, can be a configuration file of the farm and can be modified so that it can handle multiple domains. In an example, a default setting can place the shared, multi-tenant domain in each farm's tenancy store file. The presence of the shared, multi-tenant domain allows non-vanity domain tenants, plus internal monitoring tenants, to function normally. As used herein, internal monitoring tenants include spoofed or virtualized entities that may not correspond to an actual client or tenant, but provide simulated requests to the system in order to ascertain the health of the system. For example, the health of farm B 106 can include monitoring if a response is received from a farm, a response time, a configuration, and operational statistics.

When a vanity domain tenant is provisioned on farm B 106, a new entry is placed in the tenancy store B 114. In an example, tenancy store B 114 is an XML file that can be updated with the new entry. During initial provisioning, a site ID can be made for each domain in farm B 106 that this tenant is attempting to access. A site ID, like Site ID: 2 118, can include a specific string, passcode, or node that includes additional information for identification and authentication of a tenant request for access at a farm. Using a site ID like Site ID: 1 116 or Site ID: 2 118 or a similar node or other counterpart, an authentication request is redirected to a site, such as an RP site. As used herein, a site may refer to a partitioned authentication module stored in a directory that may authenticate a tenant based on their domain and stored permission.

When a request from a tenant is redirected from a farm to a specific site based on the site ID, these various site ID's can be initially be stored in an ID directory upon the initial provisioning of the domain to the tenant. As used herein, the site ID may be used as a token or internal number to lookup authentication sites within the backend. During a request for a new instance on the farm, the token site ID can be used to route site traffic to resources in the farm. The site ID for this routing can be made when a tenant is initially provisioned within a farm, and this site ID or node may be stored in the tenancy store.

Different authentication sites in a directory can refer to different partitions in the directory that provide authentication to the request based on routing from the tenancy store file and nodes stored within the tenancy store file. As discussed with respect to FIG. 1, when a request comes in to a farm, a tenancy store may store a number of authentication nodes, such as site IDs. The presence of the site ID can be detected, or if no site ID is present, then a default site ID can be used. Depending on either the default site ID being used or the custom Site ID being used, these site IDs can match the login domain name to the RP service domain name and return, in response to the request, an XML return URL.

As discussed above, in an example, the tenancy store may be an XML file. The tenancy store can be updated with the response, which may be a return URL. At runtime, in response to a tenant request reaching the farm for authentication, the farm can look up the tenancy for the user and check if there is a Site ID specified for the tenant in the tenancy store. If there is a specific Site ID, then that Site ID is used when making calls to directory for authentication. If there is no Site ID defined for the tenant in the tenancy store, then a default multi-tenant site can be used.

It is to be understood that the block diagram of FIG. 2 is not intended to indicate that the computing system 200 is to include all the components shown in FIG. 2. Rather, the computing system 200 can include fewer or additional components not illustrated in FIG. 2 (e.g., additional applications, additional modules, additional memory devices, additional network interfaces, etc.).

Figure 3:
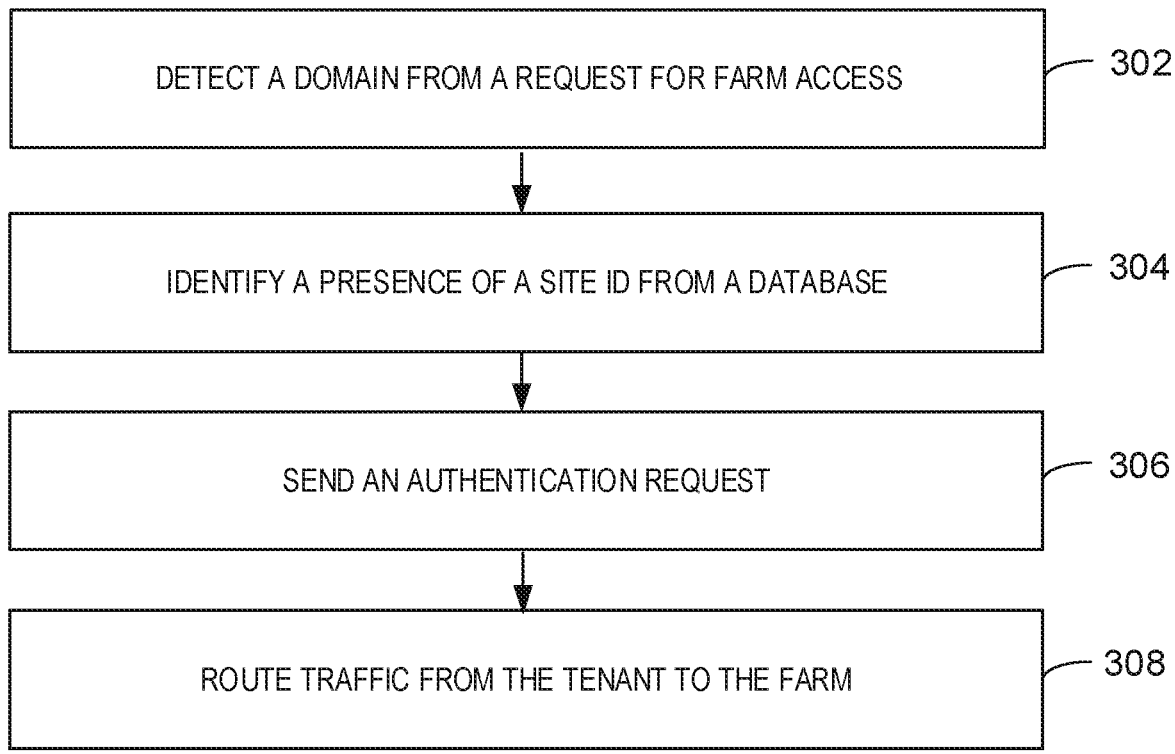
FIG. 3 is a process flow diagram of an example process for domain authentication.

FIG. 3 is a process flow diagram of an example process 300 for domain authentication. The elements of the method shown here are presented in an example order, however, other orders of this method can also function. The method 300 can be implemented with any suitable computing device, such as the computing system 200 of FIG. 2.

At block 302, the method 300 includes detecting a domain from a request of a tenant for access to a farm. In an example, the domain indicates a domain association as one of a dedicated domain or a shared domain.

At block 304, the method 300 includes identifying a presence of a site ID from a database of the farm based on the domain. In an example, the database of the farm is maintained on hardware of the farm.

At block 306, the method 300 includes sending an authentication request to a default site or a custom site, the authentication request managed through a site manager based on the identified presence of the site ID in the database of the farm. In an example, the custom site provides a custom authentication method in response to a detection of a site ID in the database, and the default site provides a default authentication method in response an absence of site ID detection in the database. In an example, the custom authentication method comprising binding the site ID to the authentication method. In an example, the authentication method is an authentication protocol. In an example, the authentication method is an authentication configuration. In an example, the site manager is a directory maintained on hardware of the farm.

At block 308, the method 300 includes routing traffic from the tenant to the farm in response to satisfaction of the authentication request. In an example, satisfaction of the authentication request is achieved through matching a listing of the domain at the custom site or the default site to the domain from the request of the tenant. In an example, the storage comprising instructions further comprises instructions that when executed on the processor cause the processor to create a site ID in response to initial provisioning a resource from a farm to a tenant using a dedicated domain.

In one embodiment, the process flow diagram of FIG. 3 is intended to indicate that the steps of the method 300 are to be executed in a particular order. Alternatively, in other embodiments, the steps of the method 300 can be executed in any suitable order and any suitable number of the steps of the method 300 can be included.

Figure 4:
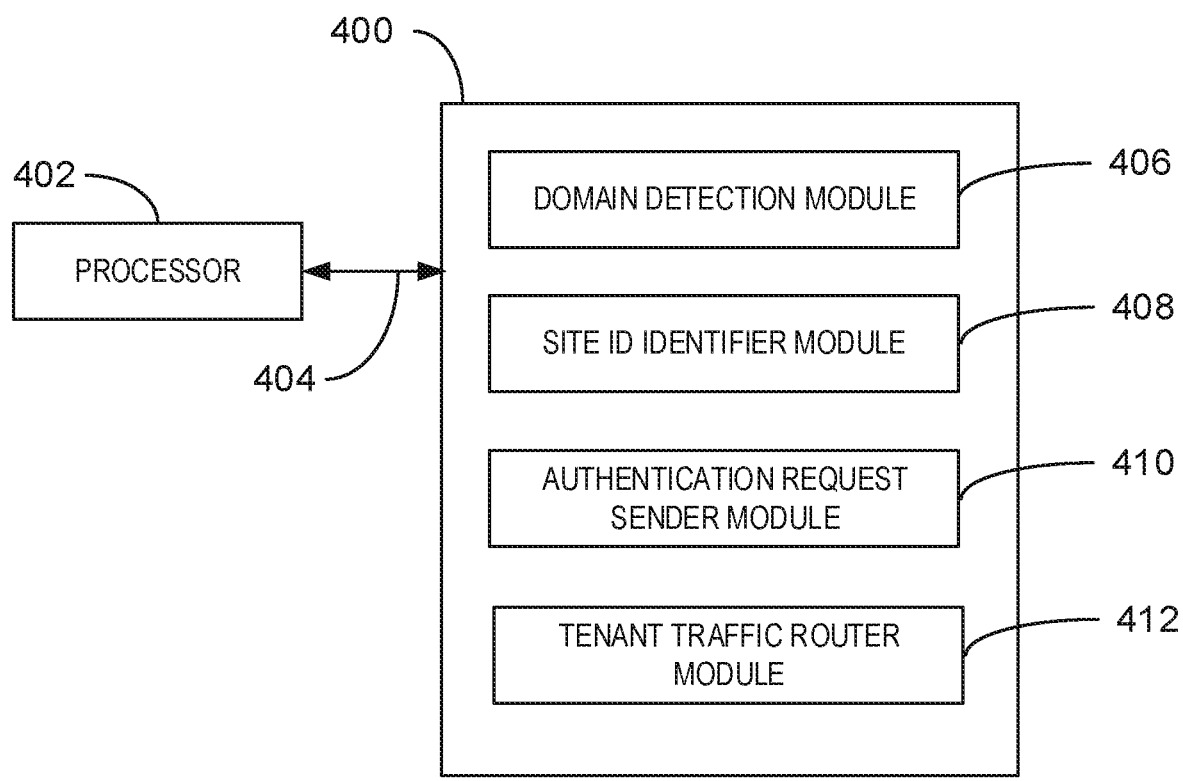
FIG. 4 is block diagram of an example computer-readable storage device for domain authentication.

FIG. 4 is block diagram of an example computer-readable storage media 400 for domain authentication. The various software components discussed herein may be stored on the tangible, computer-readable storage media 400, as indicated in FIG. 4. The tangible, computer-readable storage media 400 may be accessed by a processor 402 over a computer bus 404. Furthermore, the tangible, computer-readable storage media 400 may include code to direct the processor 402 to perform the steps of the current method 300.

The various software components discussed herein may be stored on the tangible, computer-readable storage media 400, as indicated in FIG. 4. For example, the tangible computer-readable storage media 400 can include a domain detector module 406 to detect a domain from a request of a tenant for access to a farm. In an example, the domain indicates a domain association as one of a dedicated domain or a shared domain.

The tangible computer-readable storage media 400 can include a site ID identifier module 408 to identify a presence of a site ID from a database of the farm based on the domain. In an example, the database of the farm is maintained on hardware of the farm.

The tangible computer-readable storage media 400 can include an authentication request sender module 410 to send an authentication request to a default site or a custom site, the authentication request managed through a site manager based on the identified presence of the site ID in the database of the farm. In an example, the custom site provides a custom authentication method in response to a detection of a site ID in the database, and the default site provides a default authentication method in response an absence of site ID detection in the database. In an example, the custom authentication method comprising binding the site ID to the authentication method. In an example, the authentication method is an authentication protocol. In an example, the authentication method is an authentication configuration. In an example, the site manager is a directory maintained on hardware of the farm.

The tangible computer-readable storage media 400 can include a tenant traffic router module 412 to route traffic from the tenant to the farm in response to satisfaction of the authentication request. In an example, satisfaction of the authentication request is achieved through matching a listing of the domain at the custom site or the default site to the domain from the request of the tenant. In an example, the storage comprising instructions further comprises instructions that when executed on the processor cause the processor to create a site ID in response to initial provisioning a resource from a farm to a tenant using a dedicated domain.

It is to be understood that any number of additional software components not shown in FIG. 4 may be included within the tangible, computer-readable storage media 400, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

EXAMPLES

Example 1

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for domain authentication, including a processor and a computer-readable storage device storing executable instructions that, in response to being executed by the processor, cause the processor to detect a domain from a request of a tenant for access to a farm. The system also includes identify a presence of a site identifier (ID) from a database of the farm based on the domain. The system also includes send an authentication request to a default site or a custom site, the authentication request managed through a site manager based on the identified presence of the site id in the database of the farm. The system also includes route traffic from the tenant to the farm in response to satisfaction of the authentication request. Other embodiments of this aspect include corresponding computer systems, apparatus, and computer programs recorded on one or more computer storage devices, each configured to perform the actions of the methods.

In an example, the Implementations may include one or more of the following features. The system where the custom site provides a custom authentication method in response to a detection of the site id in the database; and the default site provides a default authentication method in response an absence of the site id detection in the database. The system where the custom authentication method includes binding the site id to the authentication method. The system where the authentication method is an authentication protocol. The system where the authentication method is an authentication configuration. The system where the domain indicates a domain association as one of a dedicated domain or a shared domain. The system where satisfaction of the authentication request is achieved through matching a listing of the domain at the custom site or the default site to the domain from the request of the tenant. The system where the storage including instructions further includes instructions that in response to being executed on the processor cause the processor to create the site id in response to provisioning a resource from the farm to the tenant using a dedicated domain. The system where the database of the farm is maintained on hardware of the farm. The system where the site manager is a directory maintained on hardware of the farm. The method where the custom site provides a custom authentication method in response to a detection of the site id in the database; and the default site provides a default authentication method in response an absence of the site id detection in the database. The method where a custom authentication method including binding the site id to the authentication method. The method where the authentication method is an authentication protocol. The method where the authentication method is an authentication configuration. The method where the domain indicates a domain association as one of a dedicated domain or a shared domain. The method where satisfaction of the authentication request is achieved through matching a listing of the domain at the custom site or the default site to the domain from the request of the tenant. The computer-readable storage device where the custom site provides a custom authentication method in response to a detection of the site id in the database; and the default site provides a default authentication method in response an absence of the site id detection in the database. The computer-readable storage device where the domain indicates a domain association as one of a dedicated domain or a shared domain. Implementations of the described techniques may include hardware, a method or process, or computer software on a computer-accessible medium.

Example 2

One general aspect includes a method for domain authentication, including detecting a domain from a request of a tenant for access to a farm; identifying a presence of a site identifier (ID) from a database of the farm based on the domain; sending an authentication request to a default site or a custom site, the authentication request managed through a site manager based on the identified presence of the site ID in the database of the farm; and routing traffic from the tenant to the farm in response to satisfaction of the authentication request. Other embodiments of this aspect include corresponding computer systems, apparatus, and computer programs recorded on one or more computer storage devices, each configured to perform the actions of the methods.

In an example, implementations may include one or more of the following features. The method where the custom site provides a custom authentication method in response to a detection of the site id in the database; and the default site provides a default authentication method in response an absence of the site id detection in the database. The method where a custom authentication method including binding the site id to the authentication method. The method where the authentication method is an authentication protocol. The method where the authentication method is an authentication configuration. The method where the domain indicates a domain association as one of a dedicated domain or a shared domain. The method where satisfaction of the authentication request is achieved through matching a listing of the domain at the custom site or the default site to the domain from the request of the tenant. The computer-readable storage device where the custom site provides a custom authentication method in response to a detection of the site id in the database; and the default site provides a default authentication method in response an absence of the site id detection in the database. The computer-readable storage device where the domain indicates a domain association as one of a dedicated domain or a shared domain. Implementations of the described techniques may include hardware, a method or process, or computer software on a computer-accessible medium.

One general aspect includes a computer-readable storage device that stores instructions that, in response to an execution by a processor, cause the processor to detect a domain from a request of a tenant for access to a farm; identify a presence of a site identifier (id) from a database of the farm based on the domain; send an authentication request to a default site or a custom site, the authentication request managed through a site manager based on the identified presence of the site id in the database of the farm; and route traffic from the tenant to the farm in response to satisfaction of the authentication request. Other embodiments of this aspect include corresponding computer systems, apparatus, and computer programs recorded on one or more computer storage devices, each configured to perform the actions of the methods.

Example 3

Implementations may include one or more of the following features. The computer-readable storage device where the custom site provides a custom authentication method in response to a detection of the site ID in the database and the default site provides a default authentication method in response an absence of the site ID detection in the database. The computer-readable storage device where the domain indicates a domain association as one of a dedicated domain or a shared domain. Implementations of the described techniques may include hardware, a method or process, or computer software on a computer-accessible medium.

What is claimed is:

1. A system for domain authentication, comprising:
a processor;
a computer-readable storage device storing executable instructions that, in response to being executed by the processor, cause the processor to:
detect a domain from a request of a tenant for access to a farm;
identify a presence or absence of a site identifier uniform resource locator (site ID) from a database of the farm, where to be considered present the site ID located on the farm is detected to also link to a network location on a content management system;
send an authentication request to a default site or a custom site, the authentication request managed through a site manager based on the identified presence or absence of the site ID in the database of the farm; and
route traffic from the tenant to the farm in response to satisfaction of the authentication request, wherein satisfaction of the authentication request is achieved through matching a listing of the domain at the custom site or the default site to the domain from the request of the tenant.

2. The system of claim 1, wherein:
the custom site provides a custom authentication method in response to a detection of the site ID in the database; and
the default site provides a default authentication method in response an absence of the site ID detection in the database.

3. The system of claim 2, wherein the custom authentication method comprises binding the site ID to the authentication method.

4. The system of claim 2, wherein the default authentication method is an authentication protocol.

5. The system of claim 2, wherein the default authentication method is an authentication configuration.

6. The system of claim 1, wherein the domain indicates a domain association as one of a dedicated domain or a shared domain.

7. The system of claim 1, wherein the storage comprising instructions further comprises instructions that in response to being executed on the processor cause the processor to create the site ID in response to provisioning a resource from the farm to the tenant using a dedicated domain.

8. The system of claim 1, wherein the database of the farm is maintained on hardware of the farm.

9. The system of claim 1, wherein the site manager is a directory maintained on hardware of the farm.

10. The system of claim 1, wherein the content management system is a single instance in the farm and tenancy store and is the single instance of the content management system for both a shared domain and a dedicated domain.

11. A method for domain authentication, comprising:
detecting a domain from a request of a tenant for access to a farm;
identifying a presence or absence of a site identifier uniform resource locator (site ID) from a database of the farm, where to be considered present the site ID located on the farm is detected to also link to a network location on a content management system located on the farm;
sending an authentication request to a default site or a custom site, the authentication request managed through a site manager based on the identified presence or absence of the site ID in the database of the farm; and
routing traffic from the tenant to the farm in response to satisfaction of the authentication request, wherein satisfaction of the authentication request is achieved through matching a listing of the domain at the custom site or the default site to the domain from the request of the tenant.

12. The method of claim 11, wherein:
the custom site provides a custom authentication method in response to a detection of the site ID in the database; and
the default site provides a default authentication method in response an absence of the site ID detection in the database.

13. The method of claim 12, wherein a custom authentication method comprising binding the site ID to the authentication method.

14. The method of claim 12, wherein the default authentication method is an authentication protocol.

15. The method of claim 12, wherein the default authentication method is an authentication configuration.

16. A computer-readable storage device that stores instructions that, in response to an execution by a processor, cause the processor to:
- detect a domain from a request of a tenant for access to a farm;
- identify a presence or absence of a site identifier uniform resource locator (site ID) from a database of the farm, where to be considered present the site ID located on the farm is detected to also link to a network location on a content management system located on the farm;
- send an authentication request to a default site or a custom site, the authentication request managed through a site manager based on the identified presence or absence of the site ID in the database of the farm; and
- route traffic from the tenant to the farm in response to satisfaction of the authentication request, wherein satisfaction of the authentication request is achieved through matching a listing of the domain at the custom site or the default site to the domain from the request of the tenant.

17. The computer-readable storage device of claim 16, wherein:
- the custom site provides a custom authentication method in response to a detection of the site ID in the database; and
- the default site provides a default authentication method in response an absence of the site ID detection in the database.

18. The computer-readable storage device of claim 16, wherein the domain indicates a domain association as one of a dedicated domain or a shared domain.

* * * * *